June 26, 1923.
B. A. MITCHELL
PERCUSSION DRILL AND THE LIKE
Filed July 26, 1921
1,459,848
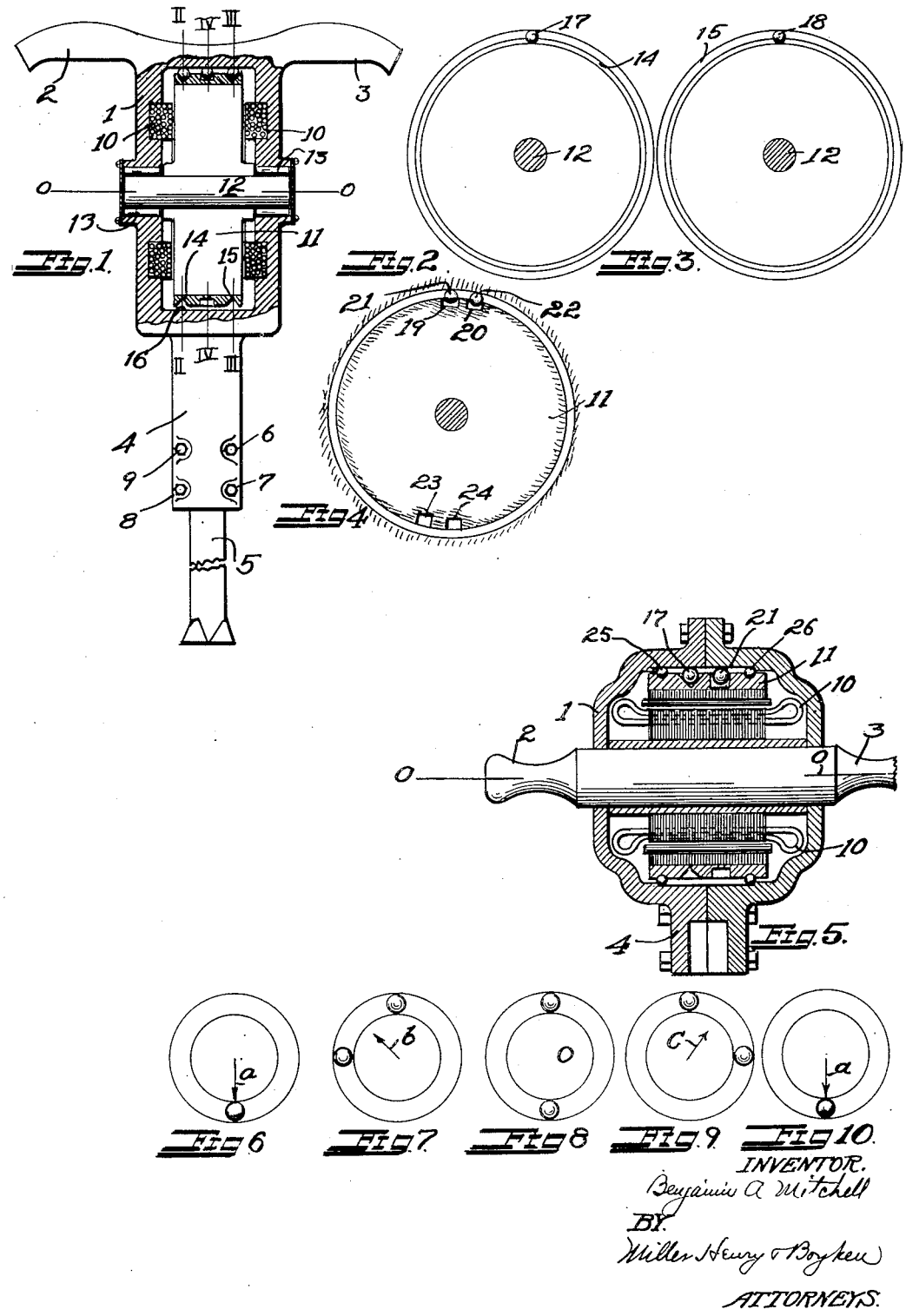

Patented June 26, 1923.

1,459,848

UNITED STATES PATENT OFFICE.

BENJAMIN A. MITCHELL, OF GARFIELD, UTAH.

PERCUSSION DRILL AND THE LIKE.

Application filed July 26, 1921. Serial No. 487,819.

*To all whom it may concern:*

Be it known that I, BENJAMIN A. MITCHELL, a citizen of the United States, and a resident of Garfield, county of Salt Lake, State of Utah, have invented a new and useful Improvement in Percussion Drills and the like, of which the following is a specification.

My invention has for its object the production of a reciprocating force in a frame carrying a percussion type of drill or the like, whereby successive impulses are given to the drill to enable it to work its way into material to be drilled. Other objects will appear from the specification and drawings.

These objects I accomplish by mounting a rotating element within a casing or frame work from which casing or frame is supported a drill of any well known form, and between the rotating element and the casing I mount two or more weights adapted to be driven at different speeds by the rotating element, whereby centrifugal forces of the weights are transferred to the casing; and the algebraic sum of these forces result at any instant of time in a resultant vibration force varying in amplitude from a minimum to a maximum and making a complete cycle during the time of two revolutions of the rotor or more than two revolutions of the rotor.

Reference is herein made to my copending applications No. 275,321, filed February 6, 1919, No. 413,844, filed September 30, 1920, and No. 487,818, filed July 26, 1921.

By referring to the accompany drawings, my invention will be made clear.

Figure 1 is a cross section through one form of my drill, which is here shown adapted to be electrically driven, and employing four weight masses to establish a resulting vibrating force.

Fig. 2 is a diagrammatic cross section of the ball race of Fig. 1 on the line II—II thereof.

Fig. 3 is a diagrammatic cross-section of the ball race of Fig. 1 on the line III—III thereof.

Fig. 4 is a diagrammatic cross section of the rotor and adjacent casing surfaces on the line IV—IV of Fig. 1, showing the use of two balls running in a pair of adjacent pockets as one of the weight masses.

Fig. 5 is a modification of my invention wherein the rotor is mounted on peripheral ball bearings.

Figs. 6, 7, 8, 9 and 10 are diagrammatic showings of the positions of the weight masses or balls corresponding with 180° of rotor revolution at each consecutive position.

Throughout the figures similar numerals refer to identical parts.

Referring particularly to Fig. 1, an outer casing or frame for the drill is indicated by the numeral 1, which is provided with handles 2, 3, in the well known way, and with a split socket 4 within which the drill may be clamped by the bolts 6, 7, 8 and 9, so that the vibration of the casing 1 is transmitted to the drill 5. Within the casing are windings 10—10 creating an electromagnetic torque upon the rotor 11 which is caused to rotate when the windings 10—10 are energized.

The rotor 11 is mounted upon the shaft 12, carried in suitable bearings 13—13, and upon the periphery of the rotor 11 are turned the ball races 14—15 respectively, and on the inside of the casing a suitable ball surface or path is provided at 16 against which the balls 17—18 respectively carried in the races 14—15 are adapted to roll. It will now be seen that the rate of rotation of the ball masses 17—18 will be some fraction of that of the rotor 11, and as these balls rotate together, the sum of their centrifugal forces will act in a radial direction in a plane through the ball centers.

At 19—20 are a pair of pockets cut in the periphery of the rotor 11, in which are mounted two other balls, preferably duplicates of 17—18, and indicated respectively at 21—22. These balls will during revolution of rotor 11, have a combined sliding and rolling action on the surface 16 and at the same rate of travel as the rotor, and their masses will act centrifugally about the axis o, o in a radial direction passing through the balls 21, 22. The resultant or geometric sum of the centrifugal forces of the balls 17—18, and 21—22 will be a maximum when all of the balls are closest together, and will be a minimum when 17—18 are diametrically opposite 21, 22.

Referring to Figs. 6 to 10 inclusive for one condition, the centrifugal force when the balls are all together may be represented by the vector arrow $a$; when one half a revolution has been made, by the vector arrow $b$; when an entire revolution has been made, the resultant will be minimum, see $o$, Fig. 8. The vector arrow $c$ (Fig. 9) indicates the relative position at one and one half revolutions, and the vector arrow $a$ (Fig. 10) at two revolutions is again a maximum and one vibration cycle displaced from that of Fig. 6. The vibration period therefor of the drill 5 caused by the differential centrifugal effect of the masses 17—18 and the masses 21—22, will be one half of the revolution period of the rotor 11, and it will be noted that the rotor is in perfect running balance at all times, and no vibration strains exist between the shaft 12 and the bearings 13—13, the entire strain of centrifugal forces of the rotating masses being taken up in the casing or frame 1.

Referring particularly to Fig. 4, I prefer to cut a second pair of pockets 23—24 opposite 19—20 so as to make the rotor symmetrical throughout and in perfect running balance, although it may be balanced in other ways, if desired.

Although I have shown the balls 17—18 running in synchronism and at one half the rotor travel, and balls 21—22 confined in pockets and running at the same speed as the rotor; any number of rotating weights may be employed in one or more pockets and in one or more races, and the differential effect of their several centrifugal forces both in direction and amplitude may be obtained to suit the requirements of any particular mechanism, without departing from my invention.

In Fig. 5 I have shown but one ball 17, adapted to travel at one half the rate of the rotor 11, and but one ball 21 traveling at the same rate as the rotor 11, and have mounted the rotor 11 on ball bearings 25—26 of any well known type and symmetrical about the axis $o$—$o$. The operation of the parts of this latter construction is similar in all respects to that of Fig. 1, the combination of the centrifugal forces of the masses 17 and 21, or their geometric sum resulting in a varying resultant force in a radial direction to the axis $o$—$o$, and of an amplitude varying from the sum of the two centrifugal forces of 21 and 17 to a minimum and back to maximum, that is through one complete vibration cycle during a period of two revolutions of the rotor 11. In case the mass of ball 17 varies with respect to the mass of ball 21, it will of course be understood that the maximum and minimum resultants of the combined centrifugal forces will vary correspondingly and when the mass of ball 17 is four times that of ball 21 the minimum resultant will be zero.

I claim:

1. In percussion apparatus, a rotor, a stationary frame having a circular surface adjacent to the rotor in running balance adapted to rotate in said frame, an annular path between said rotor and said surface, and a mass adapted to roll therein in contact with said frame surface and said rotor, a second mass in a pocket within said rotor in contact with and adapted to contact with said stationary surface during the revolution of the rotor, and means for rotating the rotor.

2. In percussion apparatus, parts as set forth in claim 1, wherein the said masses are disposed about the periphery of the rotor.

3. In percussion apparatus, parts as set forth in claim 1, wherein there are two balls located in two adjacent pockets and in the plane of revolution and wherein there is a ball path on each side of said plane and a single ball mounted to roll in each of said paths.

4. In percussion apparatus, parts as set forth in claim 1 wherein there are two balls located in two adjacent pockets and in the plane of revolution and wherein there is a ball path on each side of said plane and a single ball mounted to roll in each of said paths, and wherein the said balls are disposed about the periphery of the rotor.

5. In percussion apparatus, a stationary frame having a circular surface adjacent to a rotor, a rotor in running balance adapted to rotate within said frame, a ball mounted to roll in a path between said rotor and said surface, a second ball mounted in a pocket in said rotor opening against said surface and adapted to be driven against said surface by centrifugal force as the rotor rotates, and electric motor windings to rotate the rotor.

6. In percussion apparatus, parts as set forth in claim 5, wherein the said balls are disposed about the periphery of the rotor.

7. In percussion apparatus, parts as set forth in claim 5, wherein there are two balls located in two adjacent pockets and in the plane of revolution and wherein there is a ball path on each side of said plane and a single ball mounted to roll in each of said paths.

8. In percussion apparatus, parts as set forth in claim 5, wherein there are two balls located in two adjacent pockets and in the plane of revolution and wherein there is a ball path on each side of said plane and a single ball mounted to roll in each of said paths, and wherein the said balls are disposed about the periphery of the rotor.

9. In percussion apparatus as set forth in claim 5, wherein the rotor is provided with a ball race and ball bearings on each side of said path and pockets.

10. In a percussion drill, a casing with means for carrying a drill therein, a handle projecting from each side of said casing, a rotor and means for rotating the same within said casing, a ball adapted to roll between said rotor and said casing as the rotor rotates, and a second ball carried in a pocket within the periphery of the rotor and adapted to slide and roll on the casing as the rotor rotates.

11. In percussion apparatus, parts as set forth in claim 5, wherein the said balls are disposed about the periphery of the rotor, and wherein the rotor is provided with peripherally disposed ball bearings.

12. A percussion tool, including in combination, a casing forming a support for the tool, a rotor mounted in said casing in running balance, and an independent mass revolved by the rotor and subject to centrifugal action and co-operating with the casing for effecting vibration of said casing and tool.

13. A percussion tool, including in combination, a casing forming a support for the tool, a rotor mounted in said casing in running balance, said frame having a cylindrical surface lying adjacent the periphery of said rotor, a plurality of masses confined between said rotor and said surface, and means for operating said masses for effecting vibration of said tool.

14. A percussion tool, including in combination, a casing forming a support for the tool, a rotor mounted in said casing in running balance, said frame having a cylindrical surface disposed adjacent the periphery of said rotor, a plurality of masses confined between said rotor and said surface, and means for rotating said masses at different speeds for effecting vibration of said tool.

15. A percussion tool, including in combination, a casing forming a support for the tool, a rotor mounted in said casing in running balance, said frame having a cylindrical surface adjacent the periphery of said rotor, a plurality of masses confined between said rotor and said surface, means for rotating one of said masses at the same speed as said rotor, and means for rotating another of said masses at a different speed from that of said rotor for effecting vibration of said tool.

BENJAMIN A. MITCHELL.